United States Patent
Blanding

Patent Number: 5,829,383
Date of Patent: Nov. 3, 1998

[54] SELF-PURGING BIRD FEEDER

[76] Inventor: Leonard C. Blanding, 6600 Tanglewood, SE., Grand Rapid, Mich. 49546-7240

[21] Appl. No.: 824,033

[22] Filed: Mar. 26, 1997

[51] Int. Cl.$^6$ ................................................ A01K 39/01
[52] U.S. Cl. .............................................. 119/52.3; 119/53
[58] Field of Search .................................. 119/52.2, 52.3, 119/53, 57.8

[56] References Cited

U.S. PATENT DOCUMENTS

| | | | |
|---|---|---|---|
| D. 174,139 | 3/1955 | Sadler | D31/2 |
| D. 273,429 | 4/1984 | Kilham | D30/15 |
| 1,649,250 | 11/1927 | Patterson | 119/53 |
| 1,699,501 | 1/1929 | McCartney . | |
| 2,365,862 | 12/1944 | Bufton | 119/53 |
| 2,429,777 | 10/1947 | Smith | 119/53 |
| 2,438,080 | 3/1948 | Van Meeteren | 119/53 |
| 2,496,828 | 2/1950 | Throckmorton | 119/53 |
| 2,522,634 | 9/1950 | Pittenger | 119/53 |
| 2,591,126 | 4/1952 | Breck, Jr. | 119/53 |
| 2,721,537 | 10/1955 | Miller | 119/53 |
| 2,786,446 | 3/1957 | Newman | 119/52.3 |
| 2,884,899 | 5/1959 | Jackes et al. | 119/53 |
| 3,090,354 | 5/1963 | Merritt et al. | 119/52.3 |
| 3,134,361 | 5/1964 | Decker | 119/53 |
| 3,977,363 | 8/1976 | Fisher, Jr. | 119/52.3 |
| 4,144,842 | 3/1979 | Schlising | 119/52.3 |
| 4,977,859 | 12/1990 | Kilham | 119/52.2 |
| 5,062,388 | 11/1991 | Kilham | 119/52.2 |
| 5,289,796 | 3/1994 | Armstrong | 119/52.3 |
| 5,291,855 | 3/1994 | Laverty | 119/52.3 |
| 5,558,040 | 9/1996 | Colwell et al. | 119/52.2 |

Primary Examiner—Robert P. Swiatek
Attorney, Agent, or Firm—Price, Heneveld, Cooper, DeWitt & Litton

[57] ABSTRACT

A bird feeder includes a cylindrical body having an open top and an open bottom for holding a supply of birdseed and a cap covering the open top. A feeding platform is disposed below the open bottom and has a diameter sufficiently large to permit birds to perch thereon and feed as if ground feeding. The platform defines with the open bottom a peripheral opening for the delivery of birdseed to the platform. The platform is also vertically adjustable with respect to the open bottom of the cylindrical body for varying the height of the peripheral opening to regulate birdseed flow therethrough. A conical member is centrally positioned on an upper surface of the platform and affixed thereto. The base of the conical member has a diameter marginally smaller than the inner diameter of the cylindrical body and the cone member projects vertically into the open bottom for directing the birdseed from the interior of the body to the peripheral opening.

28 Claims, 2 Drawing Sheets

SELF-PURGING BIRD FEEDER

BACKGROUND OF THE INVENTION

The present invention relates to bird feeds, and in particular, to bird feeders of the cylindrical type.

Bird feeders in general and vertically oriented cylindrical bird feeders in particular are well known in the art. Cylindrical bird feeders are generally comprised of a hollow cylinder for holding the birdseed with a removable cover for replenishing the birdseed supply and one or more openings through the cylinder to provide access to the birdseed for the birds. Alternatively, the bottom of the cylinder has an opening whereby birdseed is allowed to flow into a pan out of which the birds may feed.

In order to attract the maximum number of birds to a bird feeder, the birdseed must be presented in a manner which appears natural to a bird and wherein the bird is not interrupted by marauding animals such as squirrels, chipmunks, or the like.

Current bird feeders which employ a bottom pan into which the birdseed flows are generally fixed in relationship to the storage cylinder and the passageway through which the birdseed flows is also generally fixed in size. The nominal size of the individual seeds differ between different types of birdseed thus, the flow characteristics of the birdseed will of necessity vary according to the type of seed. If the opening through which the seed flows is fixed, the corresponding flow rate of seed into the pan will differ also resulting in excessive or insufficient quantities of seed flowing into the pan. Furthermore, when the lower pan is one in which the edges are upturned to prevent birdseed from falling off the feeder onto the ground, the pan can trap water during rain storms thereby soaking the seeds and rendering them susceptible to spoilage. Such a pan also traps chaff and seed hulls which are inherently present in the seed and which result from birds feeding and eating at the feeder. Since birds ignore chaff and hulls, these will tend to accumulate in the pan thus displacing birdseed and making the presentation of food unattractive to the birds.

Birds who generally feed on seeds, are nominally ground feeders. Thus, feeding from a pan is unnatural to the birds and a more attractive manner of presenting the food is accomplished whereby a ground feeding environment is approximated for the birds. Finally, the cunning and agility of marauding animals such as squirrels, chipmunks, and the like have been a perennial plague to people who erect and maintain bird feeders for their viewing pleasure. The marauders are able to climb almost any variety of pole, and through instinctive intelligence, are able to defeat many of the current devices designed to prevent them from accessing the birdseed. Thus, a desirable bird feeder must incorporate a number of features designed to prevent these marauders from accessing the birdseed by climbing the support pole, jumping from adjacent trees, or jumping from nearby structures.

SUMMARY OF THE INVENTION

One aspect of the present invention is a bird feeder which includes a cylindrical body having an open top and an open bottom for holding a supply of birdseed with a cap covering the open top. A feeding platform is disposed below the open bottom and has a diameter sufficiently large to permit birds to perch thereon and simulates a ground feeding environment. The platform further defines in combination with the open bottom of the body, a peripheral opening therebetween permitting the flow of birdseed from the body to the platform. The platform is vertically adjustable with respect to the open bottom for varying the height of the peripheral opening hereby regulating the flow of birdseed therethrough. A conical member is centrally positioned on an upper surface of the platform and affixed thereto. The base of the conical member has a diameter marginally smaller than the inner diameter of the body, and the cone member projects vertically into the open bottom of the body to direct birdseed from a central interior portion of the body to the peripheral opening.

These and other features, advantages and objects of the present invention will be further understood and appreciated by those skilled in the art by reference to the following specification, claims, and appended drawings.

DETAILED DESCRIPTION OF PREFERRED EMBODIMENT

Figure 1:
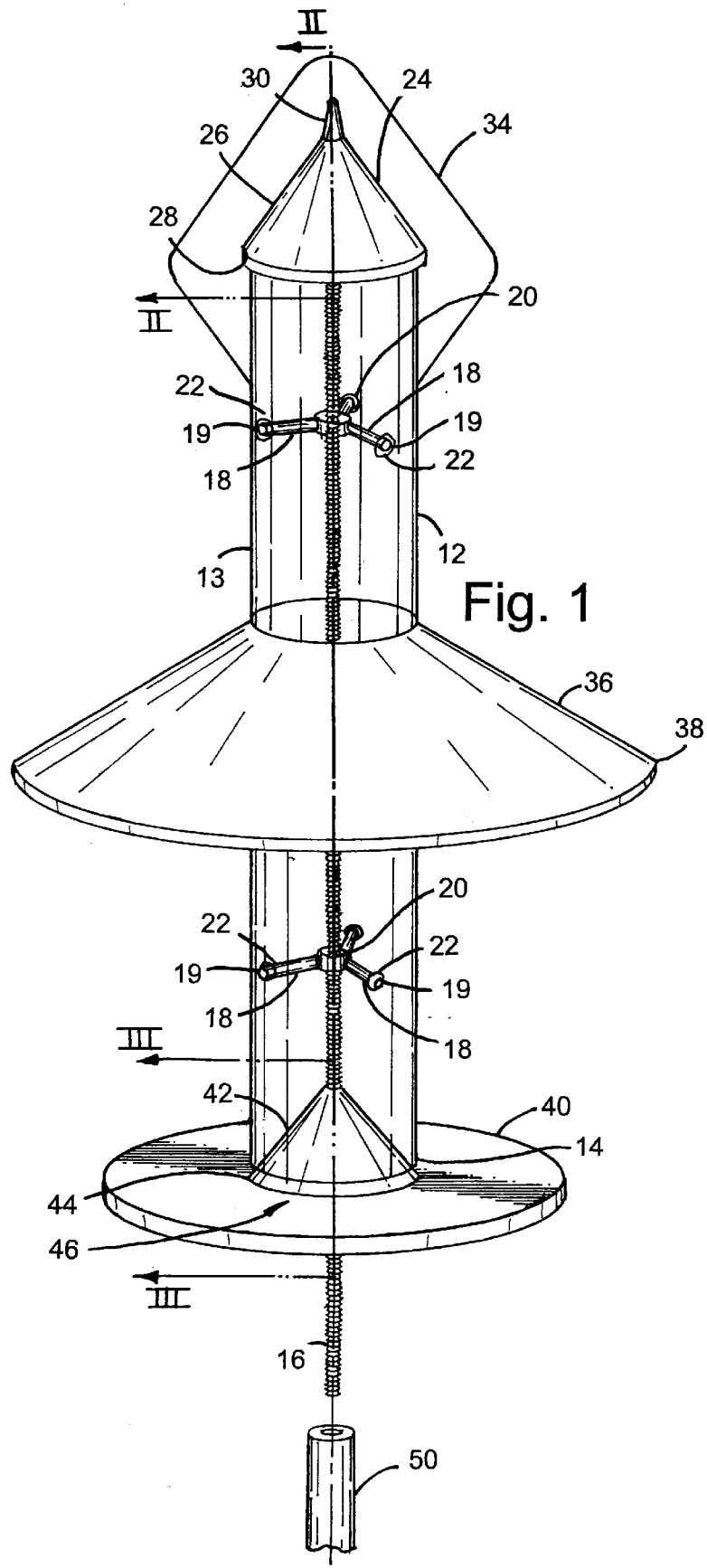
FIG. 1 is a perspective view of a bird feeder embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various orientations and step sequences, excepts where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to the drawings, FIG. 1 shows a bird feeder 10, which is one of the preferred embodiments of the present invention, and illustrates its various components. Bird feeder 10, according the preferred embodiment, includes vertical cylindrical body 12 for holding a supply of birdseed. Cylindrical body 12 typically has an open top 15 (FIG. 2) and an open bottom 14 for holding a supply of birdseed for continuous distribution to feeding birds. A threaded rod 16 coincides in a fixed relationship with the longitudinal axis of cylindrical body 12 and typically extends above open top 15 and below open bottom 14. FIG. 1 illustrates threaded rod 16 maintained in a fixed relationship to cylindrical body 12 with set screws 18. The alignment of cylindrical body 12 with threaded rod 16 is of significant importance in maintaining a desired uniform flow of birdseed, and set screws 18 function to adjust the central alignment of threaded rod 16 with respect to cylinder body 12. Threaded members 20 are positioned on threaded rod 16 proximate to each of open ends 14 and 15 of cylindrical body 12. Set screws 18 extend through the wall 13 of cylindrical body 12 and engage threaded member 20 while maintaining the desired fixed relationship between cylindrical body 12 and threaded rod 16. Resilient washers 22 provide a seal between wall 13 and screw heads 19 of set screws 18 to prevent moisture such as rain water or water from a lawn watering system from entering cylindrical body 12 and thus spoiling the birdseed in body 12.

Figure 2:
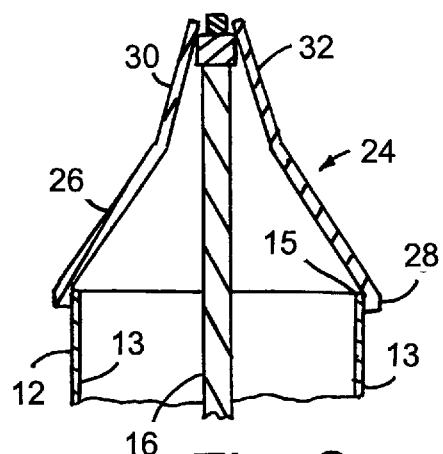
FIG. 2 is a fragmentary, cross-sectional view of the conical cover covering the open top of the cylindrical body, taken along the line II—II, FIG. 1.

Referring to FIGS. 1 and 2, a top 24 is placed over open top 15 of body 12 to shield the interior of body 12 from snow, rain water, and the like. In the preferred embodiment, top 24 is in the shape of a funnel, having a lower, conical portion 26 which has a lip 28 about its lower periphery. The interior diameter of lip 28 is larger than the exterior diameter of body 12 such that top 24 completely fits over open top 15. Top 24 has an upper handle portion 30 which is also conically shaped and has a steeper slope than lower conical portion 26. The generally conical shape of top 24 is sufficiently steeply sloped to prevent marauding animals such as squirrels, chipmunks, and the like, from gaining a foothold on the bird feeder in order to raid the supply of birdseed. The slope of top 24 causes any such marauding animal to slide off when they attempt to jump onto the top of bird feeder 10. Upper handle portion 30 has a threaded member 32 embedded in an upper portion thereof such that top 24 is maintained in a covering relationship to body 12 by rotating top 24 and threaded member 32 onto the upper end of threaded rod 16. By engaging top 24 onto bird feeder 10 in such a manner, the above referenced marauders are further prevented from gaining access to an interior portion of cylindrical body 12 to raid the birdseed stored therein.

As shown in FIG. 1, a protective hood 36 is positioned about cylindrical body 12 at an intermediate point along the length of cylindrical body 12. Hood 36 has an outer rim 38, the diameter of which is relatively large as compared to the diameter of cylindrical body 12. Hood 36 functions as a further preventative feature for denying marauding animals such as those discussed above from gaining access to the birdseed dispensed at a bottom portion of bird feeder 10. Hood 36 is generally conical in shape wherein the angle presented by the cone is steep enough to prevent marauding animals from sitting thereon in an unaided manner. In the preferred embodiment, the angle of the hood 36 surface is approximately 45° from the horizontal.

Figure 3:
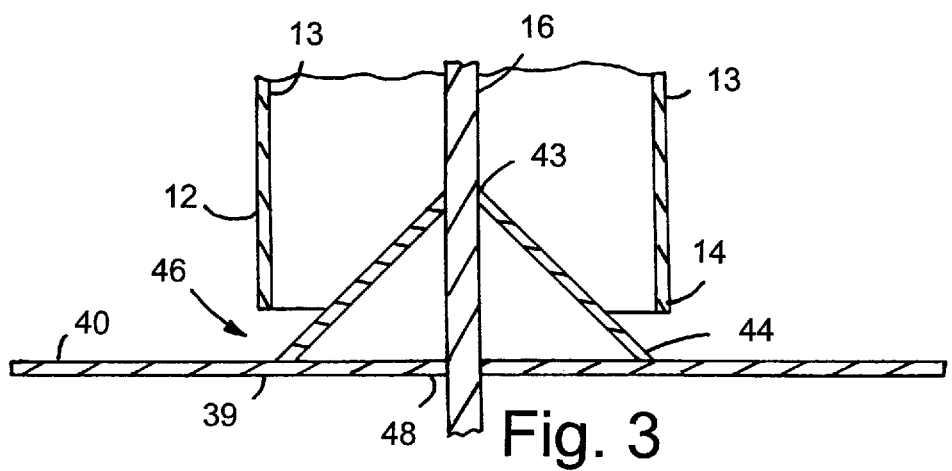
FIG. 3 is a fragmentary, cross-sectional view of the platform, conical member, showing its spaced relationship with the open bottom of the cylindrical body, taken along the line III—III, FIG. 1.

Referring now to FIGS. 1 and 3, a feeding platform 40 is disposed below open bottom 14 of cylindrical body 12. In the preferred embodiment, platform 40 is shown to be circular in shape, however, those skilled in the art will appreciate that platform 40 may assume any shape. As shown in the preferred embodiment, platform 40 is a circular, flat plate having a diameter substantially larger than cylindrical body 12. Additionally, feeding platform 40 is vertically disposed below open bottom 14, thereby defining peripheral opening 46 below open bottom 14. Peripheral opening 46 functions to regulate the flow of birdseed from cylindrical body 12 onto feeding platform 40. Since a large number of seed feeding birds are generally ground feeders, a ground feeding environment for the birds is approximated by a large, flat feeding platform 40 thus making bird feeder 10 more attractive to those species than a bird feeder employing a pan at the bottom thereof. The absence of a turned-up rim about the periphery of platform 40 facilitates a natural purging of the birdseed on platform 40. Purging occurs when chaff and seed hulls eventually work to the edge of platform 40 and fall off or are blown off by atmospheric winds leaving only seeds for the birds. Such purging is generally prevented in those bird feeders employing a pan at the bottom having upturned side edges and the chaff and hulls are retained until manually removed.

FIGS. 1 and 3 illustrate a conical member 42 centrally positioned on an upper surface of platform 40 and permanently affixed thereto. Conical member 42 has a base 44, the diameter of which in the preferred embodiment is marginally smaller than the inner diameter of cylindrical body 12. Conical member 42 projects vertically into cylindrical body 12 through open bottom 14 thereby presenting a ramped surface which directs birdseed from a central portion of cylindrical body 12 to outer peripheral opening 46, thus ensuring that all birdseed stored in cylindrical body 12 is eventually distributed through opening 46 and onto platform 40. Without conical member 42, a portion of the birdseed stored within cylindrical body 12 would remain at the central portion of platform 40 and not be distributed for access to feeding birds. This residual seed would spoil and prevent birds from feeding on bird feeder 10.

As shown in FIG. 3, threaded rod 16 extends through a center of feeding platform 40 and through the apex 43 of conical member 42. Feeding platform 40 and conical member 42 are vertically adjustable with respect to cylindrical body 12. A nut 48 is threaded onto rod 16 to abut a lower surface 39 of platform 40 and thereby provide vertical support to platform 40. Nut 48 is typically a self-locking nut to prevent an undesired misadjustment of platform 40 with respect to cylindrical body 12.

The adjustability of platform 40 with respect to cylindrical body 12 is important to regulate the proper flow of birdseed from cylindrical body 12 onto platform 40. Different species of birds have varying birdseed preferences such that the user of bird feeder 10 will select the type of birdseed according to the species of birds desired to be attracted and observed in the feeding process. Individual seed sizes differ according to each variety of birdseed such that to maintain an optimum flow of birdseed from cylindrical body 12 onto platform 40, the height of peripheral opening 46 must be adjusted according to seed size. Larger seed sizes will require a larger opening 46 than will small seed sizes. By rotating nut 48 and thus vertically adjusting platform 40, the height of peripheral opening 46 can be adjusted to facilitate the desired flow of seed from body 12 to platform 40. Bird feeder 10 can thus be used with different types of birdseed at different seasons of the year to attract those species of birds most desirable to watch during specific seasons.

While the diameter of platform 40 is sufficiently large to approximate a ground feeding environment for birds, its diameter is less than the diameter of rim 38 of hood 36. The diameter of rim 38 is larger than the diameter of platform 40 to facilitate the effective shielding of platform 40 from marauding animals. If rim 38 is smaller than or of substantially the same size as platform 40, marauding animals are able to gain access to platform 40. However, if rim 28 is larger than platform 40, the chances of a marauder gaining access to platform 40 are greatly diminished.

Bird feeder 10 may be mounted by hanging from an overhead structure or by mounting on a pole. As the sample of FIG. 1 shows, a bail 34 is positioned at an upper portion of bird feeder 10 and is attached to cylindrical body 12 thereby facilitating the hanging of bird feeder 10 from a hook or chain connected to an overhead structure. Optionally, a portion of threaded rod 16 which extends below bird feeder 10 may be utilized to mount bird feeder 10 to a pole 50 or to some other such supporting structure below bird feeder 10.

In use, top 24 is rotated to disengage from threaded rod 16 and is removed from bird feeder 10. Birdseed is poured into open top 15 of cylindrical body 12 until a desired supply of birdseed is contained within body 12. Top 24 is again placed over cylindrical body 12 and rotated to engage threaded rod 16 for maintaining top 24 in a closely held relationship to open top 15. Birdseed then flows from cylindrical body 12 through peripheral opening 46 onto platform 40 whereupon birds may feed. Chaff and seed hulls are worked off the edge of platform 40 or are blown away by the wind. When the supply of birdseed is exhausted, the process may be repeated. In the preferred embodiment, cylindrical body 12 is constructed of a clear transparent material to monitor the remaining supply of birdseed from a distance. In this manner, the birds feeding thereon are not interrupted by the owner performing repeated checks of the quantity of birdseed remaining in bird feeder 10.

In the foregoing description, it will be readily appreciated by those skilled in the art that modifications may be made to the invention without departing from the concepts disclosed herein. Such modifications are to be considered as included in the following claims, unless these claims expressly state otherwise.

The embodiments of the invention in which an exclusive property or privilege is claimed are defined as follows:

1. A bird feeder comprising:
   a cylindrical body including a substantially hollow interior for holding a supply of birdseed therein; having a generally open top, a generally open bottom, and a predetermined inner diameter;
   a cap covering said open top;
   a planar feeding platform disposed below said open bottom and having a diameter at least two times greater than said cylindrical body to permit birds to perch thereon and feed and forage as if ground feeding, said platform further defining with said open bottom a peripheral opening therebetween for the controlled delivery of birdseed to said platform from said body, said platform being vertically adjustable with respect to said open bottom for varying the height of said peripheral opening to regulate the flow of birdseed therethrough;
   a conical member having a base centrally positioned adjacent an upper surface of said platform and supported thereby, said base having a diameter marginally smaller than said inner diameter of said body whereby said conical member projects vertically into said open bottom, and directs birdseed from said interior of said body through said peripheral openings onto said platforms; and
   a plurality of horizontally oriented set screws for maintaining said cylindrical body in fixed relationship to said rod, said set screws further functioning to align said body with said conical member in a manner to provide a uniform peripheral opening about said open bottom.

2. The bird feeder of claim 1 further comprising a vertical rod substantially aligned with a longitudinal axis of said cylindrical body and maintained in a fixed relationship with said body, said rod extending above said open top and below said open bottom, said rod further extending through said platform and said conical member.

3. The bird feeder of claim 2 wherein said rod is a threaded rod and said bird feeder further comprising a nut on said threaded rod, said nut positioned below said platform for vertically adjusting said platform with respect to said body.

4. The bird feeder of claim 3 wherein said nut is a self-locking nut to prevent unwanted rotation of said nut on said rod and the misadjustment of said peripheral opening thereby.

5. The bird feeder of claim 4 wherein said rod has a bottom portion extending below said platform and further wherein said bottom portion functions as a support for mounting said bird feeder on a pole.

6. The bird feeder of claim 5 further comprising a hood about an exterior of said body and intermediate to said open top and said open bottom, said hood having a diameter substantially larger than said platform and shielding said platform from animals such as squirrels and the like jumping onto said platform and rain from wetting said platform.

7. The bird feeder of claim 6 wherein said hood has a conical shape and is sloped approximately 45° from horizontal.

8. The bird feeder of claim 7 wherein said cap is conically shaped to prevent animals from sitting thereon.

9. The bird feeder of claim 8 wherein said cap is shaped as an inverted funnel having a lower conical portion and an upper, more steeply sloped, handle portion.

10. The bird feeder of claim 9 wherein said cap includes a threaded member within said handle portion for securing said cover to said threaded rod.

11. The bird feeder of claim 6 wherein said hood has a conical shape and is sloped approximately 45° from horizontal.

12. The bird feeder of claim 2 further comprising a hood about an exterior of said body and intermediate to said open top and said open bottom, said hood having a diameter substantially larger than said platform and shielding said platform from animals such as squirrels and the like jumping onto said platform.

13. A bird feeder comprising:
   a cylindrical body including a substantially hollow interior for holding a supply of birdseed therein; having a generally open top, a generally open bottom, and a predetermined inner diameter;
   a cap covering said open top;
   a flat feeding platform disposed below said open bottom and having a shape sufficiently large to permit birds to perch thereon and feed as if ground feeding, said platform further defining with said open bottom a peripheral opening therebetween for the controlled delivery of birdseed to said platform from said body, said platform being vertically adjustable with respect to said open bottom for varying the height of said peripheral opening to regulate the flow of birdseed therethrough;
   a conical member having a base centrally positioned adjacent an upper surface of said platform and supported thereby, said base having a diameter marginally smaller than said inner diameter of said body whereby said conical member projects vertically into said open bottom, and directs birdseed from said interior of said body through said peripheral openings onto said platform;
   a vertical threaded rod substantially aligned with a longitudinal axis of said cylindrical body and maintained in a fixed relationship with said body with a plurality of horizontally oriented set screws to provide a uniform peripheral opening about said bottom, said threaded rod extending above said open top and below said open bottom, and said threaded rod further extending through said platform and said conical member; and
   a self-locking nut on said threaded rod, said nut positioned below said platform for vertically adjusting said platform with respect to said body.

14. The bird feeder of claim 13 wherein said rod has a bottom portion extending below said platform and further wherein said bottom portion functions as a support for mounting said bird feeder on a pole.

15. The bird feeder of claim 14 further comprising a hood about an exterior of said body and intermediate to said open top and said open bottom, said hood having a diameter substantially larger than said platform and shielding said platform from animals such as squirrels and the like jumping onto said platform and rain from wetting said platform.

16. The bird feeder of claim 15 wherein said hood has a conical shape and is sloped approximately 45° from horizontal.

17. The bird feeder of claim 16 wherein said cap is conically shaped to prevent animals from sitting thereon.

18. The bird feeder of claim 13 wherein said cap is shaped as an inverted funnel having a lower conical portion and an upper, more steeply sloped, handle portion.

19. The bird feeder of claim 18 wherein said cap includes a threaded member within said handle portion for securing said cover to said threaded rod.

20. A bird feeder comprising:
a cylindrical body including a substantially hollow interior for holding a supply of birdseed therein; having a generally open top, a generally open bottom, and a predetermined inner diameter;
a cap covering said open top;
a flat feeding platform disposed below said open bottom and having a shape sufficiently large to permit birds to perch thereon and feed as if ground feeding, said platform further defining with said open bottom a peripheral opening therebetween for the controlled delivery of birdseed to said platform from said body, said platform being vertically adjustable with respect to said open bottom for varying the height of said peripheral opening to regulate the flow of birdseed therethrough;
a conical member having a base centrally positioned adjacent an upper surface of said platform and supported thereby, said base having a diameter marginally smaller than said inner diameter of said body whereby said conical member projects vertically into said open bottom, and directs birdseed from said interior of said body through said peripheral opening onto said platform;
a vertical threaded rod substantially aligned with a longitudinal axis of said cylindrical body and maintained in a fixed relationship with said body, said rod extending above said open top and below said open bottom, and said rod further extending through and below said platform and said conical member;
a self-locking nut on said threaded rod, said nut positioned below said platform for vertically adjusting said platform with respect to said body;
a plurality of horizontally oriented set screws for maintaining said cylindrical body in a fixed relationship to said rod, said set screws aligning said body with said conical member in a manner to provide a uniform peripheral opening about said open bottom; and
a conically shaped hood sloped approximately 45° from horizontal about an exterior of said body and intermediate to said open top and said open bottom said hood having a diameter substantially larger than said platform and shielding said platform from animals such as squirrels and the like jumping onto said platform.

21. A bird feeder comprising:
a cylindrical body including a substantially hollow interior for holding a supply of birdseed therein; having a generally open top, a generally open bottom, and a predetermined inner diameter;
a cap covering said open top;
a substantially planar feeding platform disposed below said open bottom and having a diameter substantially greater than said cylindrical body to permit birds to perch thereon and feed and forage as if ground feeding, said platform further defining with said open bottom a peripheral opening therebetween for the controlled delivery of birdseed to said platform from said body, said platform being vertically adjustable with respect to said open bottom for varying the height of said peripheral opening to regulate the flow of birdseed therethrough;
a conical member having a base centrally positioned adjacent an upper surface of said platform and supported thereby, said base having a diameter marginally smaller than said inner diameter of said body whereby said conical member projects vertically into said open bottom, and directs birdseed from said interior of said body through said peripheral openings onto said platform;
a vertical threaded rod substantially aligned with a longitudinal axis of said cylindrical body and maintained in a fixed relationship with said body, said threaded rod extending above said open top and below said open bottom, said threaded rod further extending through said platform and said conical member;
a self-locking nut on said threaded rod, said self-locking nut positioned below said platform for vertically adjusting said platform with respect to said body; and
a plurality of horizontally oriented set screws for maintaining said cylindrical body in fixed relationship to said rod, said set screws further functioning to align said body with said conical member in a manner to provide a uniform peripheral opening about said open bottom.

22. The bird feeder of claim 21 wherein said rod has a bottom portion extending below said platform and further wherein said bottom portion functions as a support for mounting said bird feeder on a pole.

23. The bird feeder of claim 22 further comprising a hood about an exterior of said body and intermediate to said open top and said open bottom, said hood having a diameter substantially larger than said platform and shielding said platform from animals such as squirrels and the like jumping onto said platform and rain from wetting said platform.

24. The bird feeder of claim 23 wherein said hood has a conical shape and is sloped approximately 45° from horizontal.

25. The bird feeder of claim 24 wherein said cap is conically shaped to prevent animals from sitting thereon.

26. The bird feeder of claim 25 wherein said cap is shaped as an inverted funnel having a lower conical portion and an upper, more steeply sloped, handle portion.

27. The bird feeder of claim 26 wherein said cap includes a threaded member within said handle portion for securing said cap to said threaded rod.

28. The bird feeder of claim 23 wherein said hood has a conical shape and is sloped approximately 45° from horizontal.

* * * * *

UNITED STATES PATENT AND TRADEMARK OFFICE
CERTIFICATE OF CORRECTION

PATENT NO.   : 5,829,383
DATED        : November 3, 1998
INVENTOR(S)  : Leonard C. Blanding It is certified that error appears in the above-identified patent and that said Letters Patent is hereby corrected as shown below:

Column 7, claim 17, line 10;
    "claim 16" should be --claim 14--.

Column 7, claim 20, line 28;
    "thereberween" should be --therebetween--.

Signed and Sealed this

Fourth Day of May, 1999

Attest:

Attesting Officer

Q. TODD DICKINSON

Acting Commissioner of Patents and Trademarks